Oct. 2, 1945.        D. L. CAMPBELL        2,386,032
CATALYTIC CRACKING
Filed Aug. 17, 1940
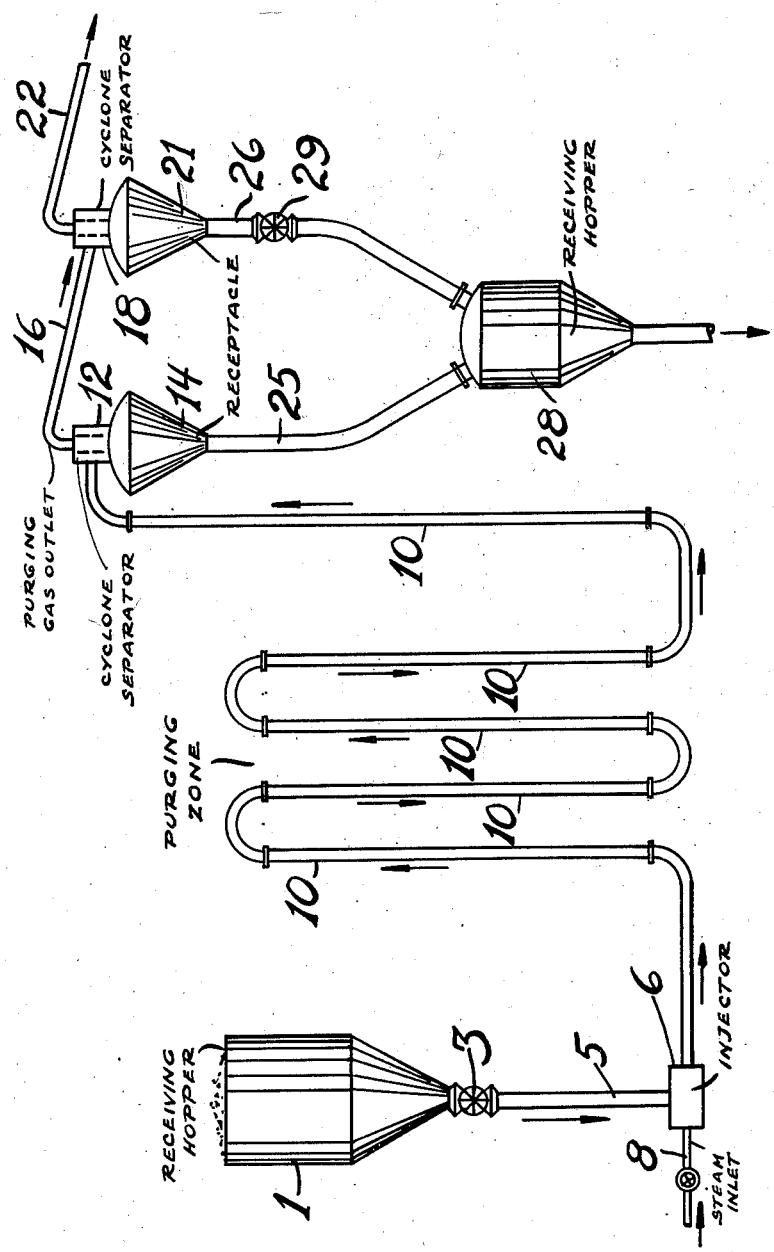
Donald L. Campbell Inventor
By P. L. Young Attorney Patented Oct. 2, 1945

2,386,032

UNITED STATES PATENT OFFICE 2,386,032

CATALYTIC CRACKING

Donald L. Campbell, Roselle Park, N. J., assignor to Standard Oil Development Company, a corporation of Delaware Application August 17, 1940, Serial No. 353,087

2 Claims. (Cl. 34—10)

The present invention relates to treatment of heavy hydrocarbons, such as gas oil, to form lighter hydrocarbons, such as gasoline, and more particularly it relates to a continuous process of cracking gas oil in vapor phase in an operation in which a powdered catalyst is suspended in the vapors as they pass through the cracking zone.

As is well known to those skilled in this art, the process of converting relatively high boiling hydrocarbons into lower boiling hydrocarbons in the presence of a catalyst results in the deposition of coke upon the catalyst, with the result that the catalyst must be periodically regenerated to remove the coke and other carbonaceous deposits. The most convenient method for regenerating a fouled catalyst of the kind here in question is to treat the fouled catalyst with a free oxygen-containing gas, such as air or air diluted with flue gas, carbon dioxide, nitrogen, and the like, at elevated temperatures and preferably under elevated pressure. Prior, however, to the combustion of the contaminants on the catalyst, it is necessary to purge the catalyst by contacting steam or some other inert gas with it in order to remove the major portion of the hydrocarbon gases between and in the pores of the catalyst, to remove the more volatile hydrocarbons, such as adsorbed gas oil, gasoline and the like, and to reduce the carbonaceous content of the catalyst substantially to a solid carbonaceous material. It will be understood that instead of using steam as the purging gas, I may use other gaseous materials, such as $CO_2$, flue gas, nitrogen, and the like. Some of the purposes of the purging are to recover valuable hydrocarbons and to reduce the size and cost of the regenerating equipment. After a thorough purging, the catalyst is then treated with an oxygen-containing gas under the conditions indicated. At the completion of the regeneration proper the catalyst may be again purged with an inert gas, such as steam, to remove from the catalyst oxygen which may have been adsorbed in the catalyst body. This is not always necessary in that this oxygen may be used up after the catalyst is separated from the regeneration stream and while it is flowing slowly through a hopper. But in case there is not enough time or not enough carbonaceous material left on the catalyst after regeneration then the regenerated catalyst should be purged to avoid oxidation of the feed stock when the catalyst is returned to the reactor.

My present invention is mainly concerned with the problem of efficiently purging both before and after the regeneration proper a contact catalyst which has been employed in a petroleum oil treating operation and has therefore become contaminated with carbonaceous deposits and coke. My invention is applicable to the type of operation in which a catalyst in powdered form is suspended in the hydrocarbon vapors during the conversion, and the outstanding advantage of my invention resides in the feature wherein the catalyst passing through a purging zone moves concurrently with respect to the purging gas as will hereinafter more fully and at large appear.

In purging a catalyst heretofore, it has been the practice to cause the catalyst to move countercurrent to the purging gas, and where the catalyst is in the form of a powder it is obvious that the linear velocity of the purging gas must be sufficiently low, say of the order of 1 inch to 6 inches per second, to permit the catalyst to pass by gravity through the purging gas. In other words, heretofore the catalyst has been purged in a vessel of relatively large diameter, and in manipulating the purging operation the catalyst has usually been discharged into the reactor at the top thereof, while the purging gas was discharged into the bottom of the reactor. As stated, the linear velocity of the purging gas in an operation of this type must necessarily be relatively low in order to permit the catalyst to pass by gravity or settle to the bottom of the reactor. In my process, I prefer to cause the purging gas, with the catalyst suspended therein, to be discharged into the purging zone and to pass therethrough at sufficient velocity to prevent settling of the catalyst, and in truth the linear velocity of the suspension of catalyst and purging gas may be passed through the purging zone at any desired velocity; and consequently my process has the advantage over the countercurrent process in that there is little or no delay or holding up of catalyst in the purging zone since the catalyst may be purged and delivered to the cracking zone or the regeneration zone as rapidly as desired.

The object of my invention is to purge a solid contact catalyst of either volatile hydrocarbons or oxygen, in an operation in which a purging gas and the catalyst flow concurrently at any desired velocity, above that which would permit settling of the catalyst, through the purging zone.

Other and further objects of my invention will appear from the following more detailed description and claims, reference being had to the accompanying drawing.

The figure represents diagrammatically a combination of apparatus elements in which my invention may be carried into practical effect.

Referring in detail to the drawing, a powdered catalyst, such as an acid treated clay having, let us say, a particle size within the range of from about 200-400 mesh and which has become contaminated with about 1% by weight of carbonaceous deposits as a result of use in the catalytic cracking of hydrocarbon oil, is withdrawn from a receiving hopper 1 containing a supply of said catalyst through star feeder 3, and thence discharged through line 5 into an injector 6 where it is dispersed or suspended in steam from some convenient source forced into the injector through line 8. Ordinarily the catalyst withdrawn from hopper 1 will be at a temperature of 800° F. to 900° F., if it has been recently recovered from a catalytic cracking operation. The steam discharged into injector 6 should be superheated to a temperature of from 800° F. to 1000° F. The suspension of fouled catalyst in steam is then discharged into a purging zone comprising elongated pipe 10 where the steam dislodges the major portion of the gases and volatile hydrocarbons from the catalyst, and thereafter the suspension is discharged into a cyclone separator 12, in which separator the major portion of the catalyst is separated from the purging gas and the volatile hydrocarbons and passes by gravity into receptacle 14, the purging gas meanwhile being withdrawn overhead through conduit 16 and preferably passes into a second cyclone separator 18 where substantially the remainder of the catalyst is separated from the gases and passes by gravity into receptacle 21, the gases being withdrawn through line 22, and, if desired, further treated to remove the last traces of fines by passage through a Cottrell precipitator (not shown) or other recovery means. The hot gases then may be cooled by passage through a waste heat boiler to a temperature below the dew point of gasoline to recover a portion of the heat in the waste gases and also to recover gasoline and gas oil therefrom. The condensation of liquid hydrocarbons may constitute a recovery means to remove the last traces of catalyst fines, which may be filtered out of the condensate product. When the purging gas used is steam, the latter may be removed from the purged gases by condensation and decantation, leaving a liquid hydrocarbon product and a non-condensable hydrocarbon product both substantially free of the purging material.

Referring back to receiving vessels 14 and 21 containing purged catalyst, the catalyst may be withdrawn from the said vessels through valve conduits 25 and 26, respectively, in the latter of which there is interposed a pressure seal such as a star feeder 29, and delivered to a receiving hopper 28. The purged catalyst may be withdrawn from the receiving hopper 28 and delivered to the regeneration equipment as desired. Following regeneration, the catalyst may be again purged of oxygen in a manner entirely analogous to that set forth above, in which the fouled catalyst was purged of hydrocarbon oils. Since the cracking operation and the regeneration operation form no part of my present invention, it will be unnecessary to describe these operations, and it is merely pointed out that the cracking operation and the regeneration operation may be carried out according to any known convenient methods.

Referring back to the purging apparatus per se, the latter in the apparatus shown consists simply of an elongated pipe having an internal diameter determined by the considerations hereinafter given and sufficiently long to permit the desired purging operation to take place. The pipe may be run horizontally or vertically or in coils but preferably vertically. Preferably about ½ to 10 volumes of inert gas (measured at the temperature and pressure in the pipe) should be used per volume of solids (bulk volume). The velocity of the suspension in the elongated pipe may vary over a wide range, from say 5 to 200 feet per second, velocities over 15 feet per second being preferred, particularly in horizontal pipes. The pipe should be long enough to give an indicated time of residence of the inert gas in the pipe based on the internal volume of the pipe and the volume rate of flow of the inert gas, measured at operating conditions of between $\frac{1}{10}$ and 10 seconds, preferably ½ to 2 seconds.

My present invention as described above is applicable to the purging of any solid material in the form of pills, pellets, extruded lengths, granules or powder in which it is desired to remove from the solid material adsorbed liquids and gases and vapors surrounding the particles and the above described method employing my improvements is merely an illustration and does not constitute a limitation thereof.

What I claim is:

1. The process of purging a powdered regenerated catalyst containing oxygen adsorbed therein which catalyst is at a temperature of about 800° F. to 900° F., which comprises suspending the catalyst in a heated inert gaseous fluid, thereafter forcing the suspension through an elongated purging zone of restricted cross sectional area at sufficient linear velocity to cause substantially concurrent flow of catalyst and gaseous fluid therethrough to remove oxygen from the catalyst, and separating the purged catalyst from the gaseous fluid containing oxygen.

2. The method set forth in claim 1, in which the heated gaseous fluid is superheated steam.

DONALD L. CAMPBELL.